US008730445B2

(12) United States Patent
Ohkubo et al.

(10) Patent No.: US 8,730,445 B2
(45) Date of Patent: May 20, 2014

(54) LIQUID CRYSTAL DISPLAY DEVICE WITH FIRST AND SECOND SUBSTRATES SEALED BY SEALING MATERIAL WITH AN END OF PROTECTIVE MATERIAL ON SECOND SUBSTRATE BEING DISPOSED BETWEEN INNER AND OUTER WALL SURFACES OF THE SEALING MATERIAL

(75) Inventors: Masahiro Ohkubo, Mobara (JP); Koichi Igeta, Chiba (JP); Go Saitou, Mobara (JP); Katsuhiro Kato, Mobara (JP)

(73) Assignees: Japan Display, Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 174 days.

(21) Appl. No.: 13/224,476

(22) Filed: Sep. 2, 2011

(65) Prior Publication Data
US 2012/0057111 A1 Mar. 8, 2012

(30) Foreign Application Priority Data
Sep. 8, 2010 (JP) ................................. 2010-200434

(51) Int. Cl.
| | |
|---|---|
| G02F 1/1339 | (2006.01) |
| G02F 1/1335 | (2006.01) |
| G02F 1/1333 | (2006.01) |
| G02F 1/1343 | (2006.01) |
| G02F 1/1337 | (2006.01) |

(52) U.S. Cl.
USPC ........... 349/153; 349/190; 349/106; 349/110; 349/141; 349/130

(58) Field of Classification Search
USPC .................. 349/106, 190, 153, 110, 141, 130
See application file for complete search history.

(56) References Cited

U.S. PATENT DOCUMENTS

| | | | | |
|---|---|---|---|---|
| 6,330,046 | B1* | 12/2001 | Ishitaka et al. ................ | 349/138 |
| 6,705,584 | B2* | 3/2004 | Hiroshima et al. ........... | 249/155 |
| 6,737,289 | B2* | 5/2004 | Woo et al. ........................ | 438/30 |
| 6,967,704 | B2* | 11/2005 | Hoshino ........................ | 349/153 |
| 7,026,100 | B2* | 4/2006 | Nakata et al. ................. | 430/321 |
| 7,920,240 | B2* | 4/2011 | Yonemura ..................... | 349/141 |
| 8,395,733 | B2* | 3/2013 | Ataka et al. ................... | 349/122 |
| 2002/0033917 | A1* | 3/2002 | Hoshino ........................ | 349/113 |
| 2007/0279572 | A1* | 12/2007 | Yonemura ..................... | 349/153 |

FOREIGN PATENT DOCUMENTS

| | | |
|---|---|---|
| JP | 05-061053 | 3/1993 |
| JP | 10-232404 | 9/1998 |
| JP | 2007-094254 | 4/2007 |
| JP | 2007-156289 | 6/2007 |
| JP | 2007-328027 | 12/2007 |
| JP | 2008-216835 | 9/2008 |
| JP | 2009-151150 | 7/2009 |

* cited by examiner

Primary Examiner — Mike Qi
(74) Attorney, Agent, or Firm — Antonelli, Terry, Stout & Kraus, LLP.

(57) ABSTRACT

The liquid crystal display device according to the present invention is a liquid crystal display device provided with a liquid crystal display panel having: a first substrate; a second substrate; a sealing material provided between the first substrate and the second substrate so that the first substrate and the second substrate are pasted together; and a liquid crystal layer sealed in the region surrounded by the sealing material between the first substrate and the second substrate, wherein the second substrate has a color filter and a protective film for covering the color filter on the surface of the second substrate on the liquid crystal layer side, and an end of the protective film is located inside an end of the second substrate and between the two sides of the sealing material, which are opposite to each other (outer wall surface and inner wall surface).

15 Claims, 12 Drawing Sheets

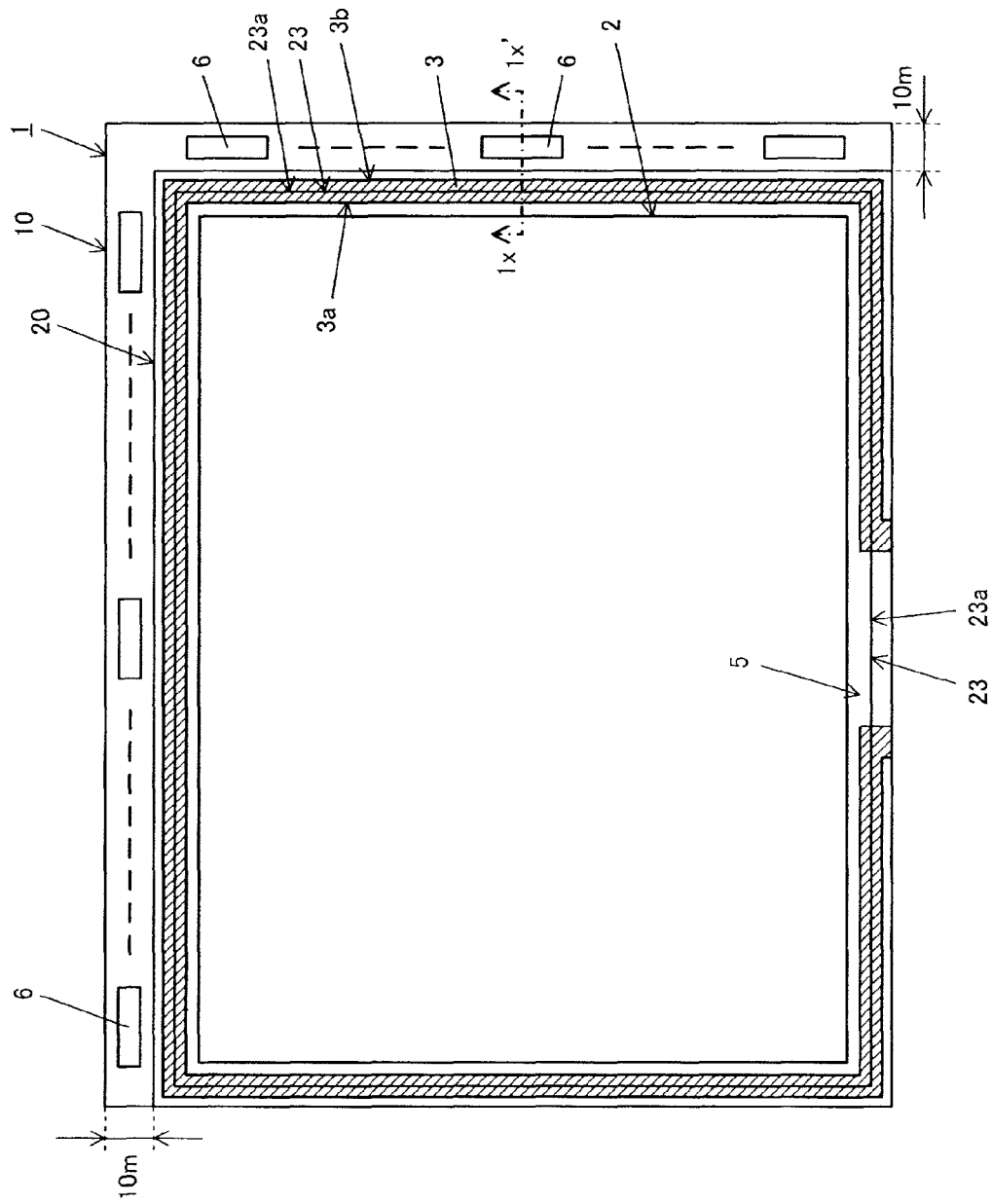

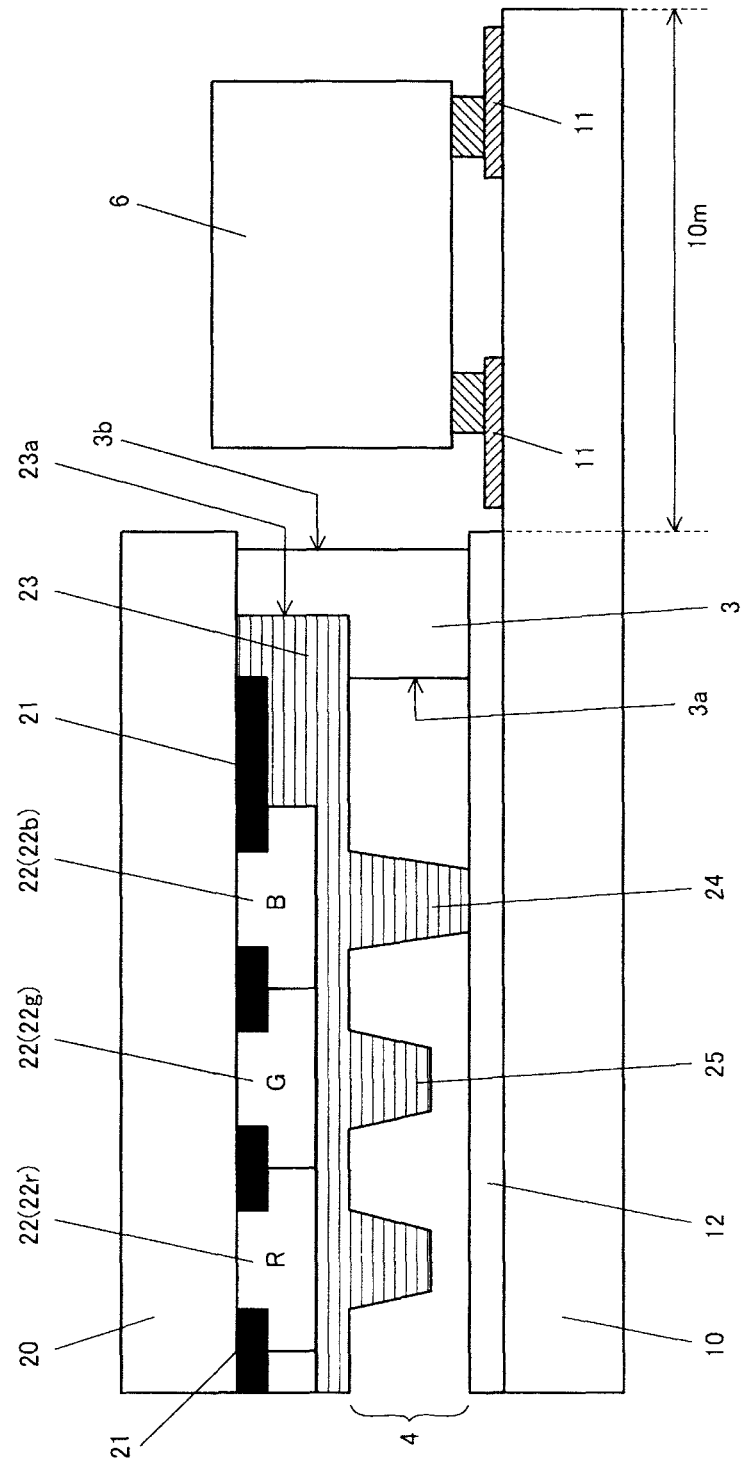

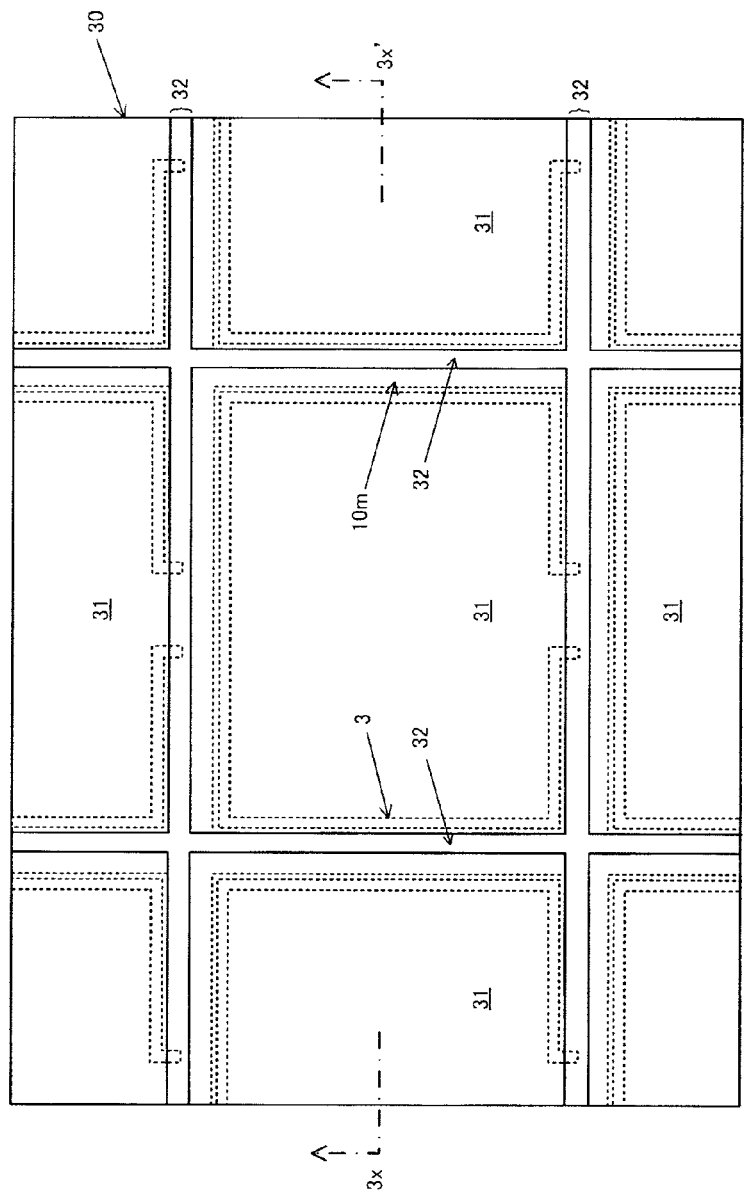
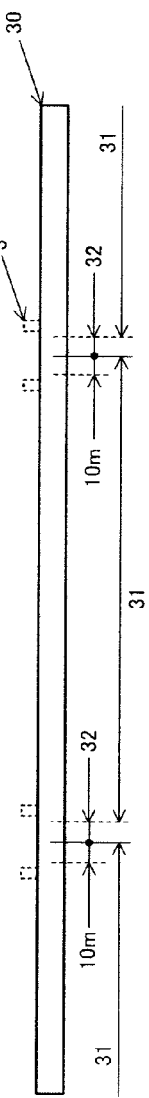
FIG.3A
FIG.3B

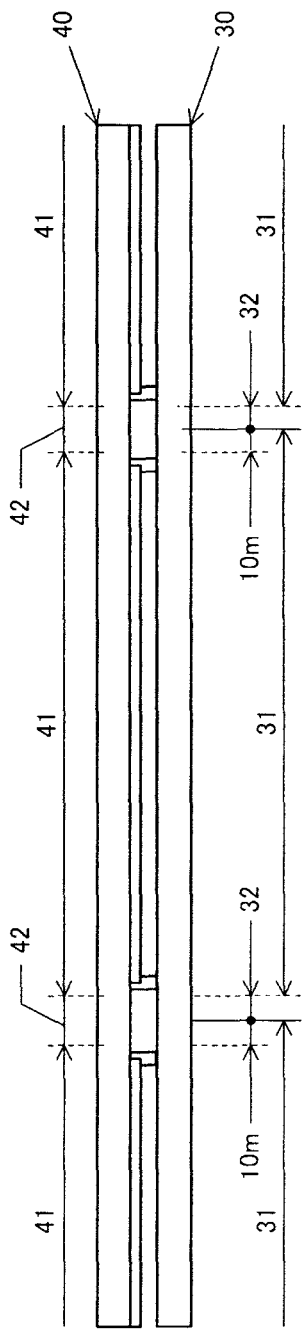
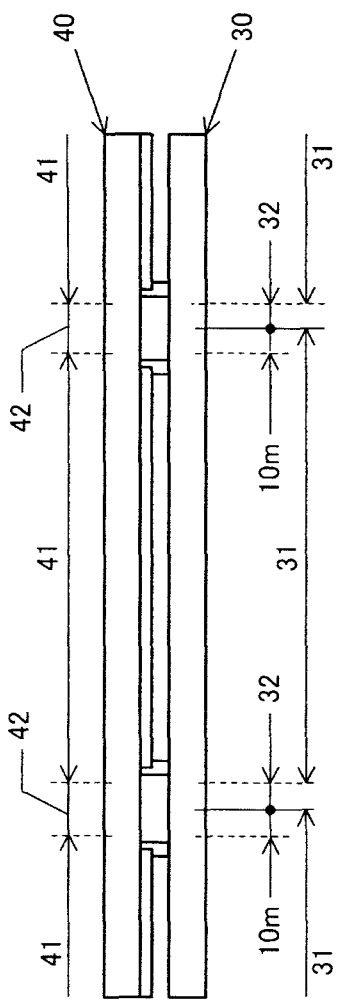

US 8,730,445 B2

LIQUID CRYSTAL DISPLAY DEVICE WITH FIRST AND SECOND SUBSTRATES SEALED BY SEALING MATERIAL WITH AN END OF PROTECTIVE MATERIAL ON SECOND SUBSTRATE BEING DISPOSED BETWEEN INNER AND OUTER WALL SURFACES OF THE SEALING MATERIAL

CROSS-REFERENCE TO RELATED APPLICATION

The present application claims priority over Japanese Application JP 2010-200434 filed on Sep. 8, 2010, the contents of which are hereby incorporated into this application by reference.

BACKGROUND OF THE INVENTION (1) Field of the Invention

The present invention relates to a liquid crystal display device, and in particular to a technology that is effective when applied to a liquid crystal display device having a liquid crystal display panel where the substrate has a color filter and a protective film formed so as to cover this color filter.

(2) Description of the Related Art

TFT (thin film transistor) type liquid crystal display devices are known as one type of liquid crystal display device. Such TFT type liquid crystal display devices are widely used as displays for various electronic devices, and mainly have a liquid crystal display panel on which any letters and images can be displayed and a semiconductor chip on which a circuit for driving and controlling this liquid crystal display panel is mounted.

The liquid crystal display panels are formed of a first substrate on which pixel electrodes, thin film transistors and the like are formed (hereinafter referred to as TFT substrate); a second substrate on which color filters and the like are formed (hereinafter referred to as CF substrate); a sealing material provided between the TFT substrate and the CF substrate so that the TFT substrate and the CF substrate are pasted together; and a liquid crystal layer that is sealed in the region surrounded by the sealing material between the TFT substrate and the CF substrate. The TFT substrate has a non-overlapping region, which does not overlap the CF substrate, and a semiconductor chip is mounted on this non-overlapping region.

Here, the prior art documents relating to the present invention include the following patent documents.

JP 10-232404A discloses a technology for coating the flat film on the array substrate side with a seal so that the flat film is not directly exposed to air, and thus the display can be prevented from deteriorating due to water absorption by the flat film.

JP 2009-151150A discloses a technology for applying a photo-curing resin to the entirety of the color filter substrate, and after that using a photomask having three or more different regions, such as an opening portion, a gray tone portion and a half-tone portion, so that a pattern on the plane is collectively drawn, exposed to light, and developed, and thus an overcoating layer, a photospacer and a sub-photospacer are collectively formed.

SUMMARY OF THE INVENTION

In the manufacture of a general TFT type liquid crystal display device, in order to increase the throughput, a first multi-substrate having a number of cell regions (product acquiring regions, product forming regions, device forming regions), each of which is defined by a separation region and has a pixel electrode, a thin film transistor and the like formed in it (hereinafter referred to as multi-TFT substrate), and a second multi-substrate having a number of cell regions (product acquiring regions, product forming regions, device forming regions), each of which is defined by a separation region and has a color filter and the like formed in it (hereinafter referred to as multi-CF substrate), are used in such a manner that a sealing material is formed on either substrate so as to correspond to each cell region, and after that each cell region of the multi-TFT substrate is pasted to the corresponding cell region of the multi-CF substrate using the sealing material, and after that the multi-TFT substrate and the multi-CF substrate are divided through the separation regions of the multi-TFT substrate and the multi-CF substrate into pieces of each cell region, and thus liquid crystal display panels are formed. The multi-TFT substrate and the multi-CF substrate are divided through mechanical cutting mainly using a wheel, and as a result of such cutting, TFT substrates are formed of a cell region in the multi-TFT substrate and CF substrates are formed of a cell region in the multi-CF substrate.

Incidentally, a semiconductor chip is mounted on the non-overlapping region on the TFT substrate after the multi-TFT substrate and the multi-CF substrate have been divided into pieces. In the case where a foreign substance adheres to the non-overlapping region in the TFT substrate, the mounting of a semiconductor chip tends to be defective, which may become a factor of lowering the yield in the manufacture of liquid crystal display devices. Therefore, it is necessary to prevent a foreign substance from adhering to the non-overlapping region on the TFT substrates as much as possible. In recent years, a COG (chip on glass) system where a bare semiconductor chip is directly mounted on the non-overlapping region on a TFT substrate has been adopted, and in particular, a so-called face down mounting, which is the mounting of a semiconductor chip in the non-overlapping region of a TFT substrate in such a manner that the surface of the semiconductor chip on which a circuit is formed faces the non-overlapping region, significantly becomes defective due to a foreign substance.

Meanwhile, not only color filters but also a protective film for covering and protecting these color filters are formed on the multi-CF substrate. This protective film is formed over the entire surface of the multi-wiring substrate, that is to say, it ranges from the cell regions to the separation regions, and the protective film is cut when the multi-CF substrate is divided through the separation regions by means of mechanical cutting using a wheel. In addition, the separation regions of the multi-CF substrate overlap the non-overlapping regions in the cell regions of the multi-TFT substrate as viewed from the top. Therefore, shavings or pieces of the protective film may adhere to the non-overlapping region of a TFT substrate as foreign substances. That is to say, in the cutting of a multi-CF substrate, the probability of a foreign substance adhering to the non-overlapping region of a TFT substrate is high.

Therefore, the present inventor focused on the protective film for protecting the color filters in order to make the present invention.

The present invention is provided in order to solve the above problem with the prior art, and an object of the present invention is to provide a technology for preventing a foreign substance from being created from the substrate on which a color filter is formed so that it is possible to increase the yield in the manufacture of liquid crystal display devices.

The above and other objects, as well as novel features of the present invention, will be clarified from the description of the present specification and the accompanying drawings.

Typical inventions from among the inventions disclosed in the present application are briefly summarized as follows.

(1) A liquid crystal display device provided with a liquid crystal display panel having: a first substrate; a second substrate; a sealing material provided between the first substrate and the second substrate so that the first substrate and the second substrate are pasted together; and a liquid crystal layer sealed in the region surrounded by the sealing material between the first substrate and the second substrate, wherein the second substrate has a color filter and a protective film for covering the color filter on the surface of the second substrate on the liquid crystal layer side, and an end of the protective film is located inside an end of the second substrate and between the two sides of the sealing material, which are opposite to each other (outer wall surface and inner wall surface).

(2) In the above (1),
the second substrate has a light blocking film coated with the protective film on the surface of the second substrate on the liquid crystal layer side, and an end of the protective film is located closer to the periphery of the second substrate than the light blocking film.

(3) In the above (1) or (2),
the liquid crystal display panel has an opening through which liquid crystal is injected provided in a portion of the sealing material, and an end of the protective film is partially exposed from the sealing material through the opening through which liquid crystal is injected.

(4) In the above (1) or (2),
the sealing material is continuously formed along the outer periphery of the second substrate.

(5) In any of the above (1) to (4),
the first substrate has a non-overlapping region which does not overlap with the second substrate, and a semiconductor chip equipped with a drive circuit for driving and controlling the liquid crystal display panel is mounted in the non-overlapping region.

(6) In any of the above (1) to (5),
the sealing material is made of a material having light blocking properties.

(7) In any of the above (1) to (6),
the protective film is made of a photosensitive material and has a structure that has been patterned in accordance with a photolithographic technology.

(8) In any of the above (1) to (7),
the liquid crystal display panel has spacers in pillar form between the first substrate and the second substrate, and the spacers in pillar form are formed integrally with the protective film through patterning of the protective film.

The effects of the representative inventions from among the inventions disclosed in the present application are briefly described as follows:

According to the present invention, a foreign substance can be prevented from being created from the substrate having a color filter so that the yield in the manufacture of liquid crystal display devices can be increased.

BRIEF DESCRIPTION OF THE DRAWINGS

FIG. 1 is a plan diagram schematically showing the structure of the liquid crystal display device according to the first embodiment of the present invention;

FIG. 2 is a cross sectional diagram showing the structure along line $1x$-$1x'$ in FIG. 1;

FIGS. 3A and 3B are diagrams schematically showing the structure of the multi-TFT substrate used for the manufacture of liquid crystal display devices according to the first embodiment of the present invention (FIG. 3A is a plan diagram showing the multi-TFT substrate as viewed from the surface on the liquid crystal layer side, and FIG. 3B is a cross sectional diagram showing the structure along line $3x$-$3x'$ in FIG. 3A);

FIGS. 6A and 6B are cross sectional diagrams showing the structure of the multilayer body of substrates in FIG. 5 (FIG. 6A is a cross sectional diagram showing the structure along line $5x$-$5x'$ in FIG. 5, and FIG. 6b is a cross sectional diagram showing the structure along line $5y$-$5y'$ in FIG. 5);

DESCRIPTION OF THE EMBODIMENTS

Figure 4A:
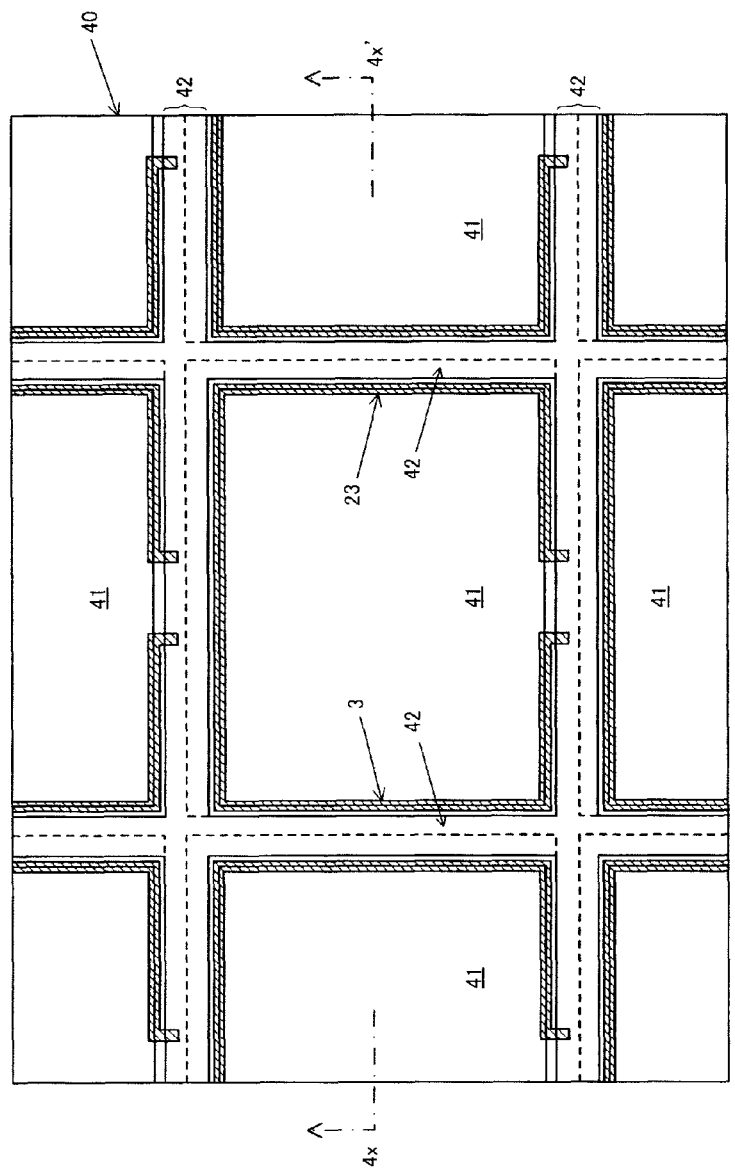
FIGS. 4A and 4B are diagrams schematically showing the structure of the multi-CF substrate used for the manufacture of liquid crystal display devices according to the first embodiment of the present invention (FIG. 4A is a perspective plan diagram showing the multi-CF substrate as viewed from the surface on the viewer's side, and FIG. 4B is a cross sectional diagram showing the structure along line $4x$-$4x'$ in FIG. 4A)

In the following, the embodiments of the present invention are described in detail in reference to the drawings. Here, the same symbols are attached to components having the same function for all drawings for illustrating the embodiments of the invention, and the same descriptions are not repeated.

[First Embodiment]

The liquid crystal display device according to the present embodiment is a TFT type liquid crystal display device that is used for a display in an electronic device for automobiles and digital steel cameras (DSCs).

FIGS. 1 to 10 are diagrams showing the liquid crystal display device according to the first embodiment of the present invention, and the structure of the liquid crystal display device is first described in reference to FIGS. 1 and 2.

FIG. 1 is a plan diagram schematically showing the structure of the liquid crystal display device; and FIG. 2 is a cross sectional diagram showing the structure along line 1x-1x' in FIG. 1.

The liquid crystal display device according to the first embodiment is, as shown in FIGS. 1 and 2, provided with a liquid crystal display panel 1 and a semiconductor chip 6 equipped with a circuit for driving and controlling this liquid crystal display panel 1. Furthermore, though not shown, the liquid crystal display device according to the first embodiment is provided with a flexible printed circuit (FPC) connected to the liquid crystal display panel 1, a backlight located on the side opposite the viewer of the liquid crystal display panel 1, and a frame for containing the liquid crystal display panel 1 together with this backlight.

The liquid crystal display panel 1 has: a first substrate 10 on which pixel electrodes, thin film transistors and the like are formed and which is rectangular as viewed from the top (hereinafter referred to as TFT substrate); a second substrate 20 on which color filters 22 and the like are formed and which is rectangular and has a smaller size than the TFT substrate 10 as viewed from the top (hereinafter referred to as CF substrate); a display region 2 located in the portion where the TFT substrate 10 and the CF substrate 20 overlap; a sealing material 3 placed between the TFT substrate 10 and the CF substrate 20 so as to surround this display region 2; and a liquid crystal layer 4 sealed in the region surrounded by the sealing material 3 between the TFT substrate 10 and the CF substrate 20. The TFT substrate 10 and the CF substrate 20 are pasted together by means of the sealing material 3 so as to be fixed to each other.

A number of pixels are provided in a matrix in the display region 2, and each of these pixels has a pixel electrode and a counter electrode. Though not shown, a polarizing plate is pasted to the surface of the TFT substrate 10 on the side opposite the surface on the liquid crystal layer side and to the surface of the CF substrate 20 on the side opposite the surface on the liquid crystal layer side, respectively.

Here, the minimum unit for displaying letters and graphics is referred to as dot, and a dot of this minimum unit is referred to as pixel for liquid crystal displays. In addition, for color displays, three pixel colors, red (R), green (G) and blue (B), are set for one dot, and a one-third (⅓) dot divided by RGB is referred as sub-pixel. The three sub-pixels may be of cyan, magenta and yellow instead of R, G and B. A full-color system is adopted for the liquid crystal display device according to the present invention, and a pixel corresponding to one dot for the color display consists of sub-pixels for red (R), green (G) and blue (B).

Glass substrates are used for the TFT substrate 10 and the CF substrate 20. A thermosetting epoxy resin material, to which a material having light blocking properties, for example, a black pigment such as titanium black or carbon black, is added, is used for the sealing material 3. The liquid crystal display panel 1 according to the present embodiment has an opening 5 through which liquid crystal is injected and which is provided in a portion of the sealing material 3, and a liquid crystal sealing material for clogging this opening 5 through which liquid crystal is injected, though not shown in order to simplify the drawings.

Here, the liquid crystal display panel 1 according to the present embodiment is an IPS (in plane switching) type liquid crystal display panel. In the case of this IPS type, the counter electrodes are provided on the TFT substrate 10 together with the pixel electrodes, while in the case of TN type and VA type liquid crystal display panels, the counter electrodes are provided on the CF substrate 20, unlike the pixel electrodes.

Typically, the TFT substrate 10 is rectangular. When two directions perpendicular to each other in a plane are direction X (first direction) and direction Y (second direction), the TFT substrate 10 has two short sides located on the sides opposite each other in the direction X and two long sides located on the sides opposite each other in the direction Y, and furthermore has a non-overlapping region 10m which does not overlap the CF substrate 20 along one short side and one long side. A number of semiconductor chips 6 are mounted in the non-overlapping region 10m on the TFT substrate 10 along the long and short sides of the TFT substrate 10. Each of the number of semiconductor chips 6 is mounted in the non-overlapping region 10m on the TFT substrate 10 in such a state that the surface on which a circuit is formed faces the TFT substrate 10, that is to say, face down mounting is carried out. In the present embodiment, each of the number of semiconductor chips 6 has a number of electrode pads provided on the surface on which a circuit is formed, and these electrode pads are electrically and physically connected to a number of electrodes 11 made of part of a number of wires formed in the non-overlapping region 10m on the TFT substrate 10 with protruding electrodes in between.

Typically, the CF substrate 20 is rectangular, of which the long and short sides are shorter than the corresponding long and short sides of the TFT substrate. When two directions perpendicular to each other in a plane are direction X and direction Y, the CF substrate 20 has two short sides located on the sides opposite each other in the direction X and two long sides located on the sides opposite each other in the direction Y.

Though not shown in detail, scanning lines, gate insulating films, video lines, an interlayer insulating film, counter electrodes, another interlayer insulating film and pixel electrodes are formed on the surface of the TFT substrate 10 on the liquid crystal layer side, and furthermore a flattened film 12 is formed so as to cover these, and moreover an alignment film is formed so as to cover this flattened film 12.

A light blocking film (black matrix) 21, red (R), green (G) and blue (B) color filters 22 (22r, 22g, 22b) are formed on the surface of the CF substrate 20 on the liquid crystal layer side in this order from the CF substrate 20 towards the liquid crystal layer 4, and furthermore a protective film 23 for protecting the color filters 22 is formed so as to cover the color filter 22, and in addition an alignment film is formed so as to cover this protective film 23.

Spacers in pillar form having different heights, two types of spacers in pillar form (24, 25) in the present embodiment, are formed in the display region 2 between the TFT substrate 10 and the CF substrate 20, in other words, in the liquid crystal layer 4 in the liquid crystal display panel 1. The spacers in pillar form 24, which are taller than the spacers in pillar form 25, are there to adjust the cell gap, and the spacers in pillar form 25, which are shorter than the spacers in pillar form 24, are there to prevent the substrates from bending.

The protective film 23 is made of a photosensitive material and has a structure patterned in accordance with a photolithographic technology where the outer peripheral end (side) 23a is located inside the outer peripheral end (side) of the CF substrate 20. The spacers in pillar form (24, 25) are formed between the protective film 23 and the alignment film by patterning the protective film 23 so as to have a structure integrally formed with the protective film 23.

The outer peripheral end 23a of the protective film 23 is located inside the outer peripheral end of the CF substrate 20 and between the two sides (inner wall surface 3a and outer wall surface 3b) located on the sides of the sealing material 3, which are opposite each other. The outer peripheral end 23a of the protective film 23 is mainly located in the sealing material 3, and an opening 5 through which liquid crystal is injected is provided in a portion of the sealing material 3 in the present embodiment, and therefore the outer peripheral end 23a of the protective film 23 is partially exposed, from the sealing material 3 through the opening 5 through which liquid crystal is injected.

In addition, the outer peripheral end 23a of the protective film 23 is located closer to the outer peripheral end of the CF substrate 20 than the light blocking film 21 in order to protect the light blocking film 21.

In the manufacture of the liquid crystal display device according to the present embodiment, in order to improve the throughput, a first multi-substrate (hereinafter referred to as multi-TFT substrate) having a number of cell regions (product forming regions, product acquiring regions), which are divided by separation regions and respectively have a pixel electrode and a thin film transistor formed in them, and a second multi-substrate (hereinafter referred to as multi-CF substrate) having a number of cell regions (product forming regions, product acquiring regions), which are divided by separation regions and respectively have a color filter in them, are used in such a manner that a sealing material is formed on either multi-substrate, the multi-TFT substrate or the multi-CF substrate, so as to correspond to each cell region, and after that the multi-TFT substrate and the multi-CF substrate are pasted together by means of this sealing material, and then the multi-TFT substrate and the multi-CF substrate are cut into pieces for the respective cell regions through the separation regions in the respective multi-substrates, and thus liquid crystal display panels are formed.

Figure 5:
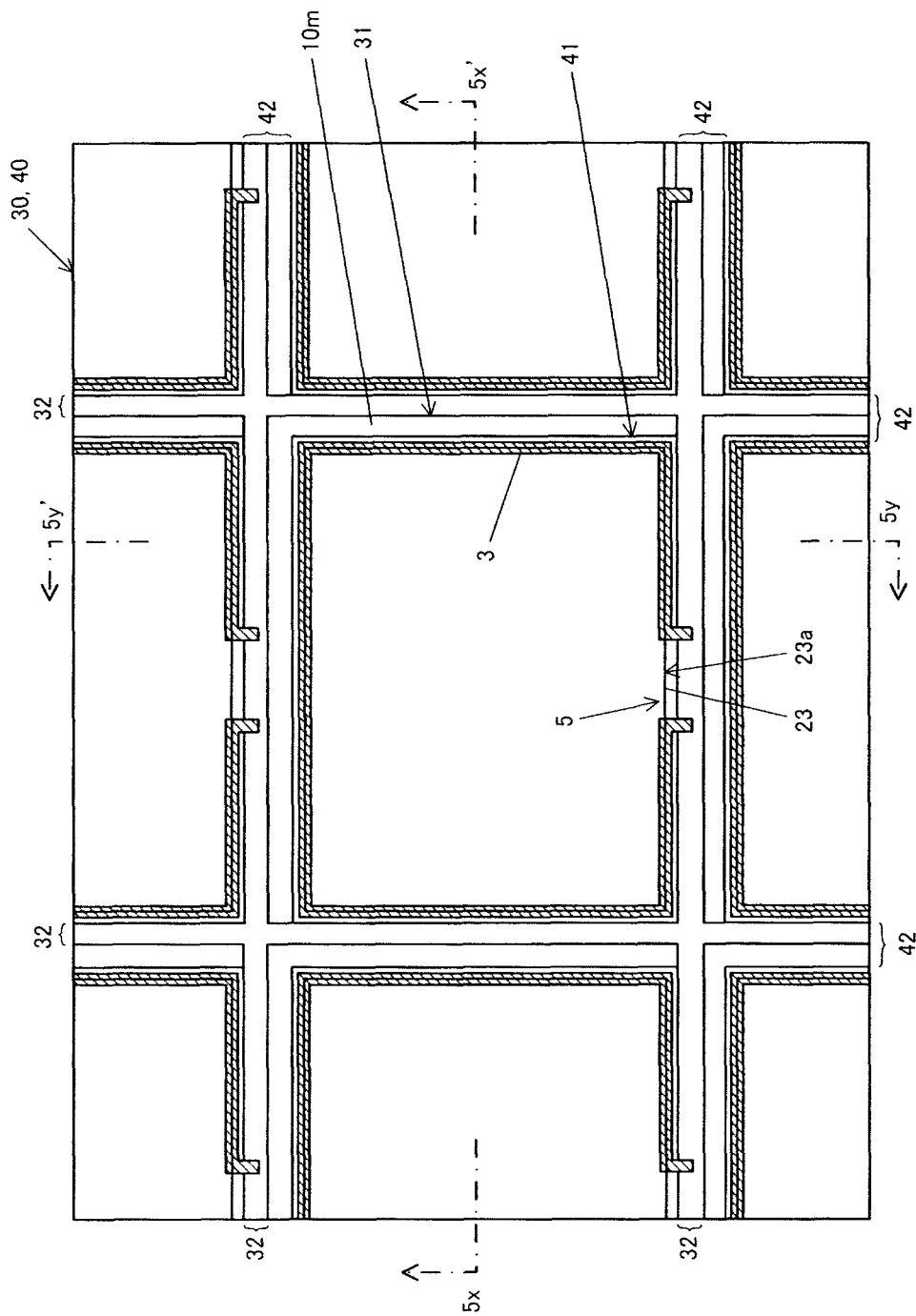
FIG. 5 is a perspective plan diagram showing the multi-TFT substrate in FIGS. 3A and 3B and the multi-CF substrate in FIGS. 4A and 4B pasted together (multilayer body of substrates) during the manufacture of liquid crystal display devices according to the first embodiment of the present invention as viewed from the surface on the viewer's side.

Here, in the manufacture of a liquid crystal display device according to the present embodiment, the multi-TFT substrate 30 in FIGS. 3A and 3B and the multi-CF substrate 40 in FIG. 5 are used, and the multi-TFT substrate 30 and the multi-CF substrate 40 are cut, mainly through mechanical cutting using a wheel. As a result of the cutting, a TFT substrate 10 is formed of a cell region in the multi-TFT substrate and a CF substrate 20 is formed of a cell region in the multi-CF substrate, respectively.

Next, the multi-TFT substrate and multi-CF substrate used for the manufacture of liquid crystal display devices according to the first embodiment of the present invention are described in reference to FIGS. 3A to 4B.

Figure 4B:
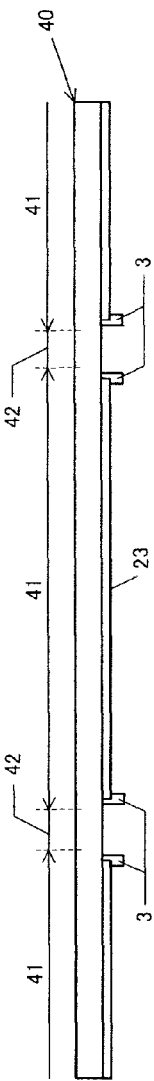

FIGS. 3A and 3B are diagrams schematically showing the structure of the multi-TFT substrate (FIG. 3A is a plan diagram showing the multi-TFT substrate as viewed from the surface on the liquid crystal layer side, and FIG. 3B is a cross sectional diagram showing the structure along line 3x-3x' in FIG. 3A); and FIGS. 4A and 4B are diagrams schematically showing the structure of the multi-CF substrate (FIG. 4A is a perspective plan diagram showing the multi-CF substrate as viewed from the surface on the viewer's side, and FIG. 4B is a cross sectional diagram showing the structure along line 4x-4x' in FIG. 4A).

Here, in FIGS. 3A to 4B, some portions of the substrates are shown for a better understanding of the drawings.

When two directions that are perpendicular to each other in a plane are direction X and direction Y, the multi-TFT substrate 30 in FIGS. 3A and 3B has a number of cell regions (product forming regions, device forming regions, product acquiring regions) 31 which are aligned in the directions X and Y, that is, in a matrix, and a pixel electrode, a thin film transistor and the like are formed in each of these cell regions 31. The liquid crystal display panel 1 in the present embodiment is an IPS type liquid crystal display panel where a counter electrode is also formed in each cell region 31.

The cell regions 31 are divided by separation regions 32 and basically have the same structure and plan view as in the TFT substrate 10 in FIGS. 1 and 2. That is to say, each of the cell regions 31 on the multi-TFT substrate 30 has a non-overlapping region 10m which does not overlap the cell region 41 on the below described multi-CF substrate 40. The TFT substrate 10 is formed by cutting the multi-TFT substrate 30 through the separation regions 32 so that the cell regions 31 are divided into individual pieces.

When two directions that are perpendicular to each other in a plane are direction X and direction Y, the multi-CF substrate 40 in FIGS. 4A and 4B has a number of cell regions (product forming regions, device forming regions, product acquiring regions) aligned in the direction X and in the direction Y, that is, in a matrix, and a light blocking film (21), a color filter (22) and a protective film 23 are formed in each of these cells 41.

The cell regions 41 are divided by the separation regions 42 and basically have the same structure and plan view as in the CF substrate 20 in FIGS. 1 and 2. That is to say, each of the cell regions 41 in the multi-CF substrate 40 has a color filter 22 and a protective film 23 for covering the color filter 22 on the surface on the liquid crystal layer side. The CF substrate 20 is formed by cutting the multi-CF substrate 40 through the separation regions 42 so that the cell regions 41 are divided into individual pieces. The cell regions 41 in the multi-CF substrate 40 respectively correspond to the cell regions 31 in the multi-TFT substrate 30.

Here, FIGS. 4A and 4B show the multi-CF substrate 40 on which a sealing material 3 is formed. The sealing material 3 is formed on at least either the multi-TFT substrate 30 or the multi-CF substrate 40 during the manufacture for a liquid crystal display device. In the present embodiment, as shown in FIGS. 4A and 4B, the sealing material 3 is formed on the multi-CF substrate 40. FIGS. 3A and 3B show the location of the sealing material denoted as dotted lines.

In addition, the dotted lines in FIG. 4A show the cell regions 31 in the multi-TFT substrate 30 when the multi-TFT substrate 30 and the multi-CF substrate 40 are layered on top of each other.

Figure 7:
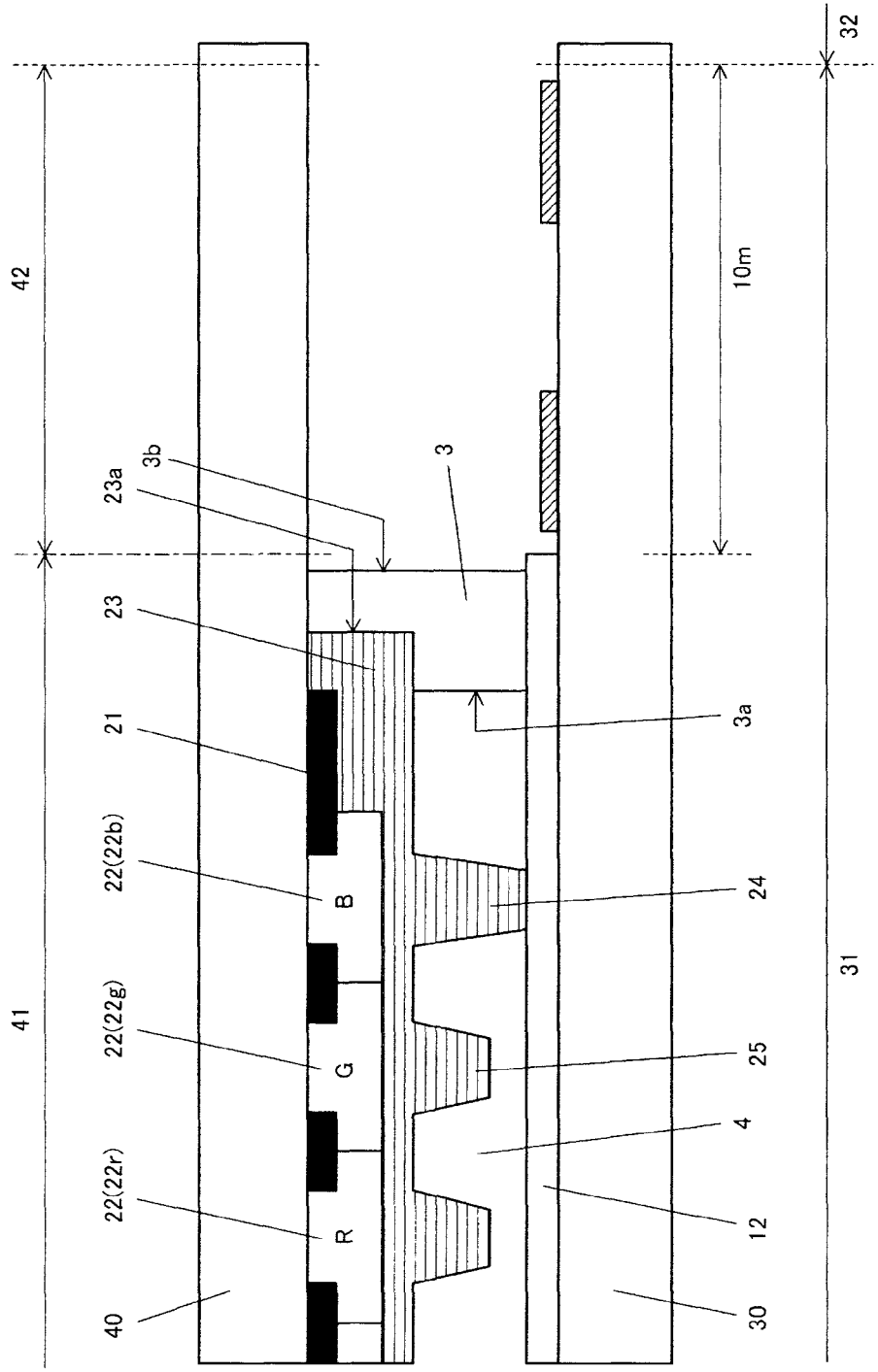
FIG. 7 is a cross sectional diagram showing an enlargement of a part in FIG. 6A.

Here, each of the cell regions 41 in the multi-CF substrate 40 basically has the same structure and plan view as in the CF substrate 20, and therefore as shown in FIG. 7, the outer peripheral end 23a of the protective film 23 in the cell region 41 of the multi-CF substrate 40 is located inside the outer periphery of the cell region 41 and between the two sides (inner wall surface 3a, outer wall surface 3b) of the sealing material 3 opposite each other.

Next, the manufacture of liquid crystal display devices according to the present embodiment is described in reference to FIGS. 3A to 10. First, the assembling process is described, and after that the patterning of the protective film 23 in accordance with a photolithographic technology is described.

Figure 8:
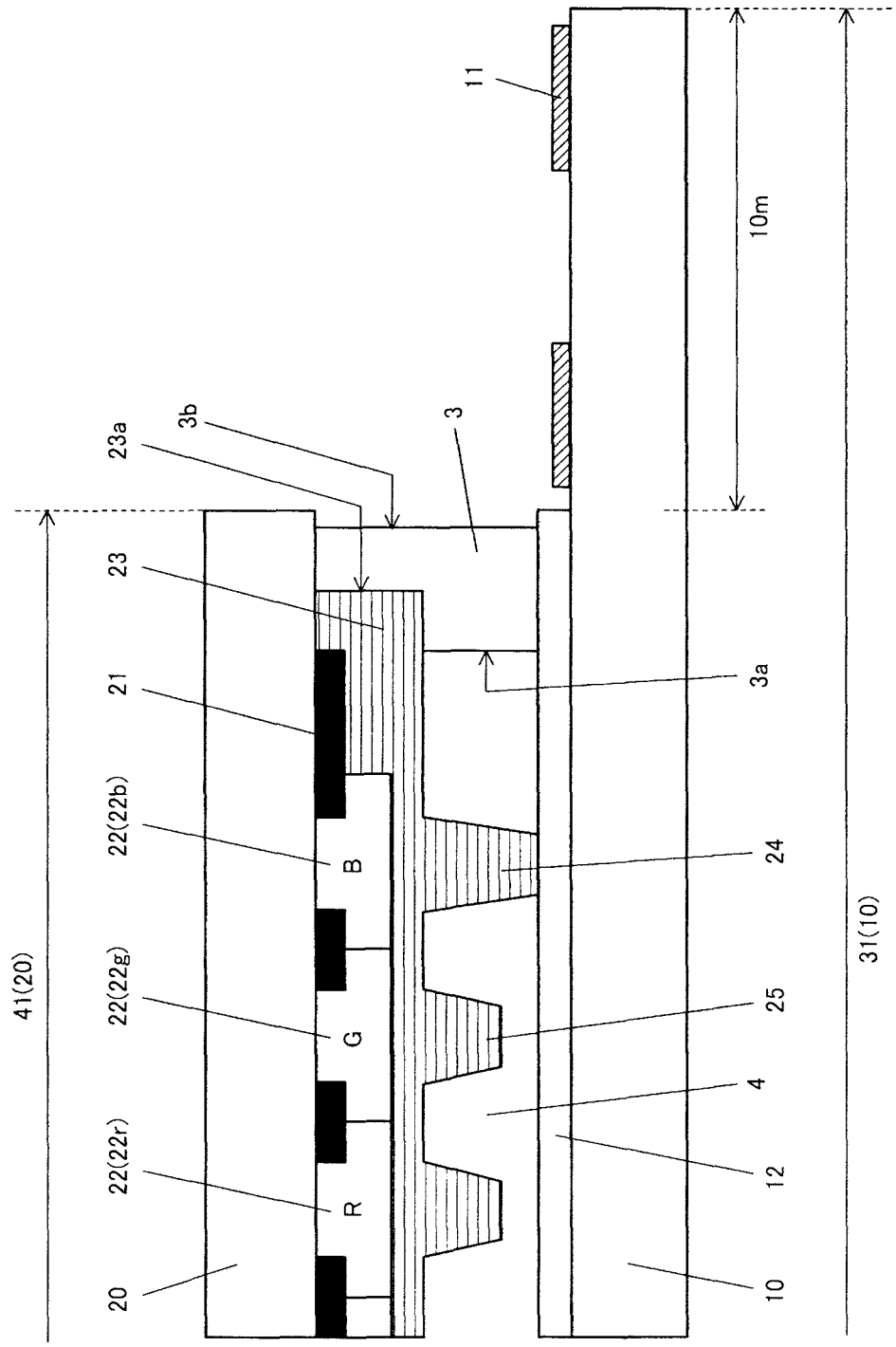
FIG. 8 is a cross sectional diagram showing the multilayer body of substrates in FIG. 6 in such a state as being divided through cutting during the manufacture of liquid crystal display devices according to the first embodiment of the present invention.
Figure 9:
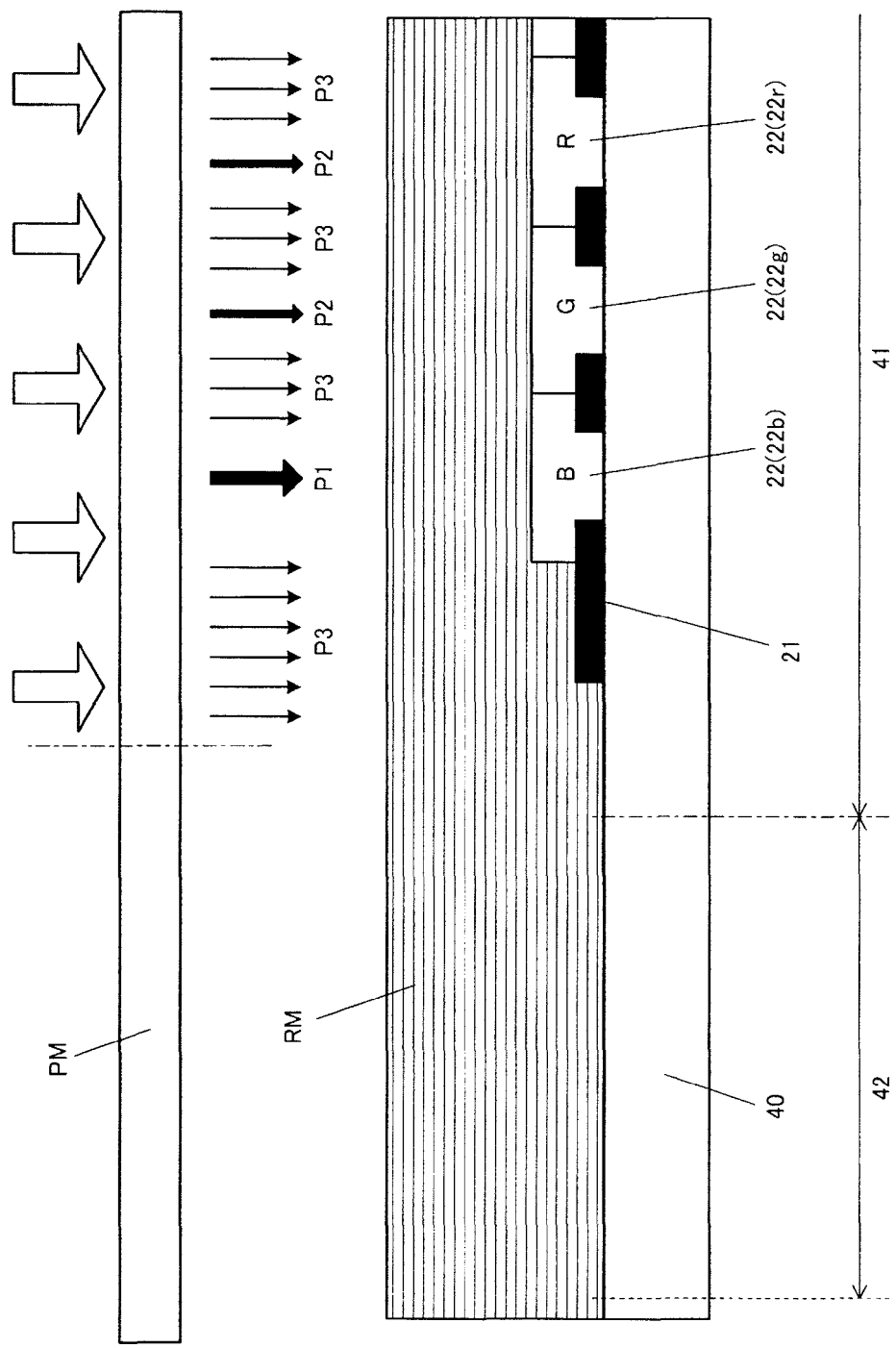
FIG. 9 is a cross sectional diagram showing the multi-CF substrate in the step of exposing the protective film to light during the manufacture of liquid crystal display devices according to the first embodiment of the present invention.
Figure 10:
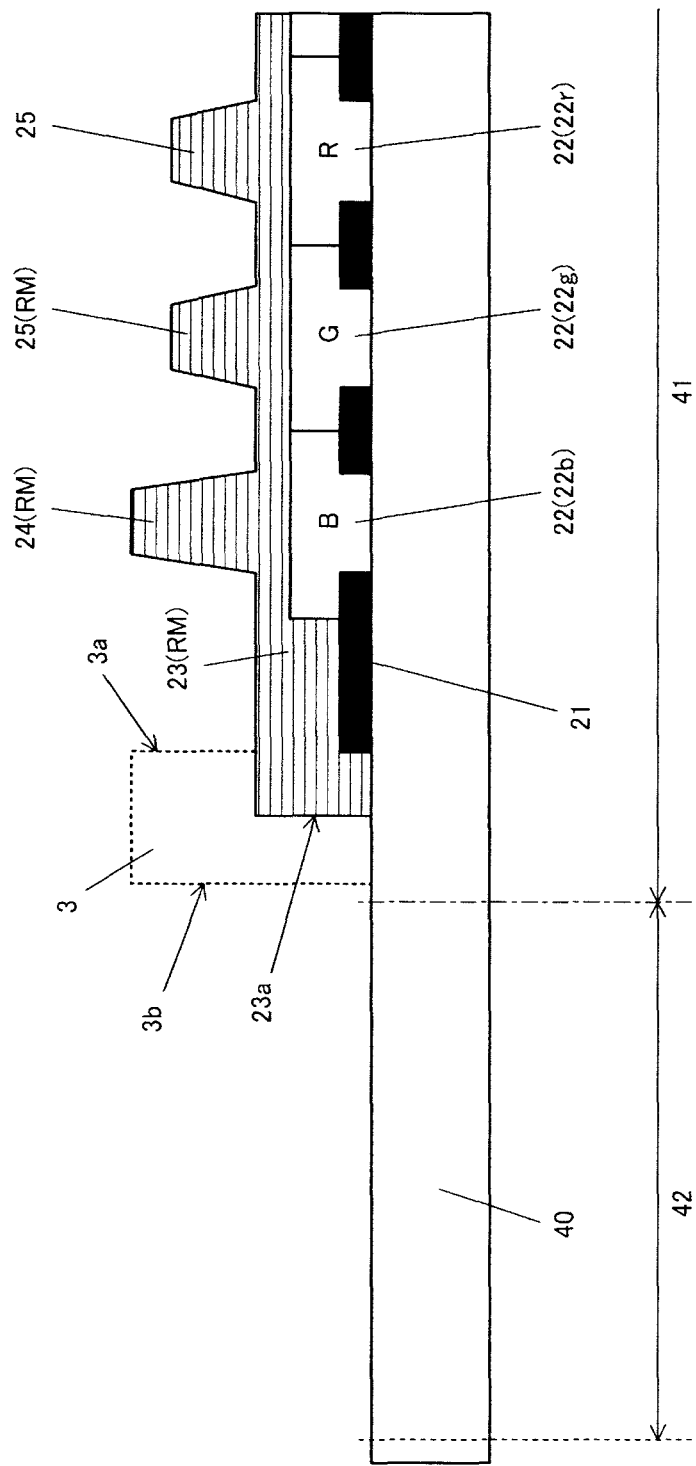
FIG. 10 is a cross sectional diagram showing the multi-CF substrate after the step of developing the protective film during the manufacture of liquid crystal display devices according to the first embodiment of the present invention.

FIG. 5 is a perspective plan diagram showing the multi-TFT substrate in FIGS. 3A and 3B and the multi-CF substrate in FIGS. 4A and 4B pasted together (multilayer body of substrates) during the manufacture of liquid crystal display devices as viewed from the surface on the viewer's side;

FIGS. 6A and 6B are cross sectional diagrams showing the structure of the multilayer body of substrates in FIG. 5 (FIG. 6A is a cross sectional diagram showing the structure along line 5x-5x' in FIG. 5, and FIG. 6b is a cross sectional diagram showing the structure along line 5y-5y' in FIG. 5);

FIG. 7 is a cross sectional diagram showing an enlargement of a part in FIG. 6A;

FIG. 8 is a cross sectional diagram showing the multilayer body of substrates in FIG. 6 in such a state as being divided through cutting during the manufacture of liquid crystal display devices;

FIG. 9 is a cross sectional diagram showing the multi-CF substrate in the step of exposing the protective film to light during the manufacture of liquid crystal display devices; and FIG. 10 is a cross sectional diagram showing the multi-CF substrate after the step of developing the protective film during the manufacture of liquid crystal display devices.

First, a multi-TFT substrate 30, as in FIGS. 3A and 3B, and a multi-CF substrate 40, as in FIGS. 4A and 4B, are prepared.

Next, a sealing material 3 is formed on at least either the multi-TFT substrate 30 or the multi-CF substrate 40. In the present embodiment, as shown in FIGS. 4A and 4B, a sealing material 3 is formed on the surface of the multi-CF substrate 40 on the liquid crystal layer side. A sealing material made of a thermosetting epoxy resin material, to which a material having light blocking properties, for example, a black pigment such as titanium black or carbon black, is added, is used as the sealing material 3, which is formed in accordance with, for example, a dispensing method or a screen printing method.

Here, the sealing material 3 makes the cell regions 31 in the multi-TFT substrate 30 and the cell regions 41 in the multi-CF substrate 40 be pasted together so as to be fixed to each other, and at the same time makes the liquid crystal be sealed in between the cell regions 31 in the multi-TFT substrate 30 (TFT substrate 10) and the cell regions 41 in the multi-CF substrate 40 (CF substrate 20). The sealing material 3 is formed so as to surround the display region in each of the cell regions 41 in the multi-CF substrate 40, and an opening 5 through which liquid crystal is injected is provided in a portion of the sealing material 3. In addition, the outer peripheral end 23a of the protective film 23 in the cell regions 41 in the multi-CF substrate 40 is located between the two sides (inner wall surface 3a, outer wall surface 3b) of the sealing material 3 opposite each other. In addition, the outer peripheral end 23a of the protective film 23 is partially exposed from the sealing material 3 through the opening 5 through which liquid crystal is injected, and the remaining portion is located in the sealing material 3.

Next, the multi-TFT substrate 30 and the multi-CF substrate 40 are positioned and layered on top of each other so that the sealing material 3 intervenes between the respective cell regions 31 in the multi-TFT substrate 30 and the respective cell regions 41 in the multi-CF substrate 40, and after that the multi-TFT substrate 30 and the multi-CF substrate 40 are heated in such a state where pressure is applied to them so that the sealing material 3 is cured, and the respective cell regions 31 in the multi-TFT substrate 30 and the respective cell regions 41 in the multi-CF substrate 40 are pasted together by means of the sealing material 3 (see FIGS. 5 to 7). In this process, a multilayer body of substrates where a multi-TFT substrate 30 and a multi-CF substrate 40 are pasted together by means of a sealing material 3 is formed.

Next, as shown in FIG. 8, the multi-TFT substrate 30 and the multi-CF substrate 40 are divided into individual cell regions by mechanically cutting the multi-TFT substrate 30 and the multi-CF substrate 40 through the separation regions (32, 42) using a wheel. As a result, TFT substrates 10 are formed of a cell region 31 in the multi-TFT substrate 30, and at the same time CF substrates 20 are formed of a cell region 41 in the multi-CF substrate 40. In addition, the two substrates (10, 20) are fixed to each other through the sealing material 3 between these substrates, and thus a liquid crystal display panel 1 is formed.

In this process, the multi-CF substrate 40 is divided through mechanical cutting of the separation regions 42 using a wheel as shown in FIG. 8, where the outer peripheral end 23a of the protective film 23 in the multi-CF substrate 40 is located inside the outer periphery of the cell regions 41 (outer periphery of the CF substrate 20) and between the two sides (inner wall surface 3a and outer wall surface 3b) of the sealing material opposite each other, and therefore the protective film 23 is not cut when the multi-CF substrate 40 is divided through mechanical cutting of the separation regions 42 using a wheel, and therefore there is no such problem that shavings or pieces of the protective film 23 adhere to the non-overlapping region 10m of the cell regions 31 (TFT substrate 10) in the multi-TFT substrate 30 as foreign substances.

Next, liquid crystal is injected into the region surrounded by the sealing material 3 in the liquid crystal display panel 1 through the opening 5 in the sealing material 3 so as to form a liquid crystal layer 4, and after that the opening 5 through which liquid crystal is injected is clogged with a liquid crystal sealing material made of, for example, an epoxy resin.

Next, in the liquid crystal display panel 1, a polarizing plate is pasted to the surface of the CF substrate 20 on the side opposite the surface on the liquid crystal layer side (surface on the viewer side) and the side of the TFT substrate 10 on the side opposite the surface on the liquid crystal layer side (surface on the backlight side), respectively, and after that a semiconductor chip 6 is mounted on the non-overlapping region 10m on the TFT substrate 10, and then a number of terminals for connection to the outside provided in the non-overlapping region 10m on the TFT substrate 10 are electrically and mechanically connected to a number of wires of a flexible printed circuit.

Next, the liquid crystal display panel 1 is placed on a backlight that has been separately fabricated, and then the liquid crystal display panel 1 is contained in a frame together with the backlight, and thus the liquid crystal display device according to the present embodiment is almost complete.

Next, the manufacture of a multi-CF substrate 40 is described in reference to FIGS. 9 and 10.

First, a multi-CF substrate 40 is prepared, and after that a light blocking film 21, a color filter 22 (22b, 22g, 22r) and the like are formed corresponding to each cell region 41 on the surface of the multi-CF substrate 40 on the liquid crystal layer side.

Next, a protective film 23 for protecting the color filter 22 is formed in accordance with a photolithographic technology, and at the same time spacers in pillar form (24, 25) having different heights are formed.

First, as shown in FIG. 9, a photosensitive material is applied to form a photoresist film RM on the entire surface of the multi-CF substrate 40 on the liquid crystal layer side so as to cover the color filter 22 in each of the cell regions 41.

Next, a photomask PM, of which the transmittance is differentiated, is used to carry out a half-tone light exposure process on the photoresist film RM. This half-tone light exposure process is carried out by differentiating the transmittance so that P1>P2>P3 when the transmittance for spacers in pillar form 24 is P1, the transmittance for spacer in pillar form 25 is P2, and the transmittance for the protective film 23 is P3 in the case where the photoresist film RM is of a negative type.

Next, a developing process and a baking process are carried out on the photoresist film RM on which a light exposure process has been carried out. As a result, as shown in FIG. 10, a protective film 23 for protecting the color filter 22 is formed in each cell region 41 so as to cover the color filter 22, and at the same time spacers in pillar form (24, 25) having different heights are integrally formed with the protective film 23. The outer peripheral end 23a of the protective film 23 is located inside the outer periphery of each of the cell regions 41 between the inner wall surface 3a and the outer wall surface 3b of the sealing material 3 that is formed in the following process.

After that, an alignment film is formed on the protective film 23, which includes spacers in pillar form (24, 25) in each of the cell regions 41, and as a result the multi-CF substrate 40 according to the present embodiment is almost complete.

Incidentally, a semiconductor chip 6 is mounted in the non-overlapping region 10m on the TFT substrate 10 after the multi-TFT 30 and the multi-CF substrate 40 have been divided into pieces. In the case where a foreign substance adheres to the non-overlapping region 10m on this TFT substrate 10, the mounting of the semiconductor chip 6 tends to be defective, which causes the yield in the manufacture of liquid crystal display devices to lower, and therefore it is necessary to prevent a foreign substance from adhering to the non-overlapping region 10m on the TFT substrate 10 as much as possible. In recent years, a COG (chip on glass) system where a bare semiconductor chip is directly mounted in the non-overlapping region 10m on the TFT substrate 10 has been adopted, and in particular, a so-called face down mounting, which is the mounting of a semiconductor chip 6 in the non-overlapping region 10m of the TFT substrate 10 in such a manner that the surface of the semiconductor chip 6 on which a circuit is formed faces the non-overlapping region 10m, significantly becomes defective due to a foreign substance.

Meanwhile, not only color filters 22 but also a protective film 23 for covering and protecting these color filters 22 are formed on the multi-CF substrate 20.

Figure 11:
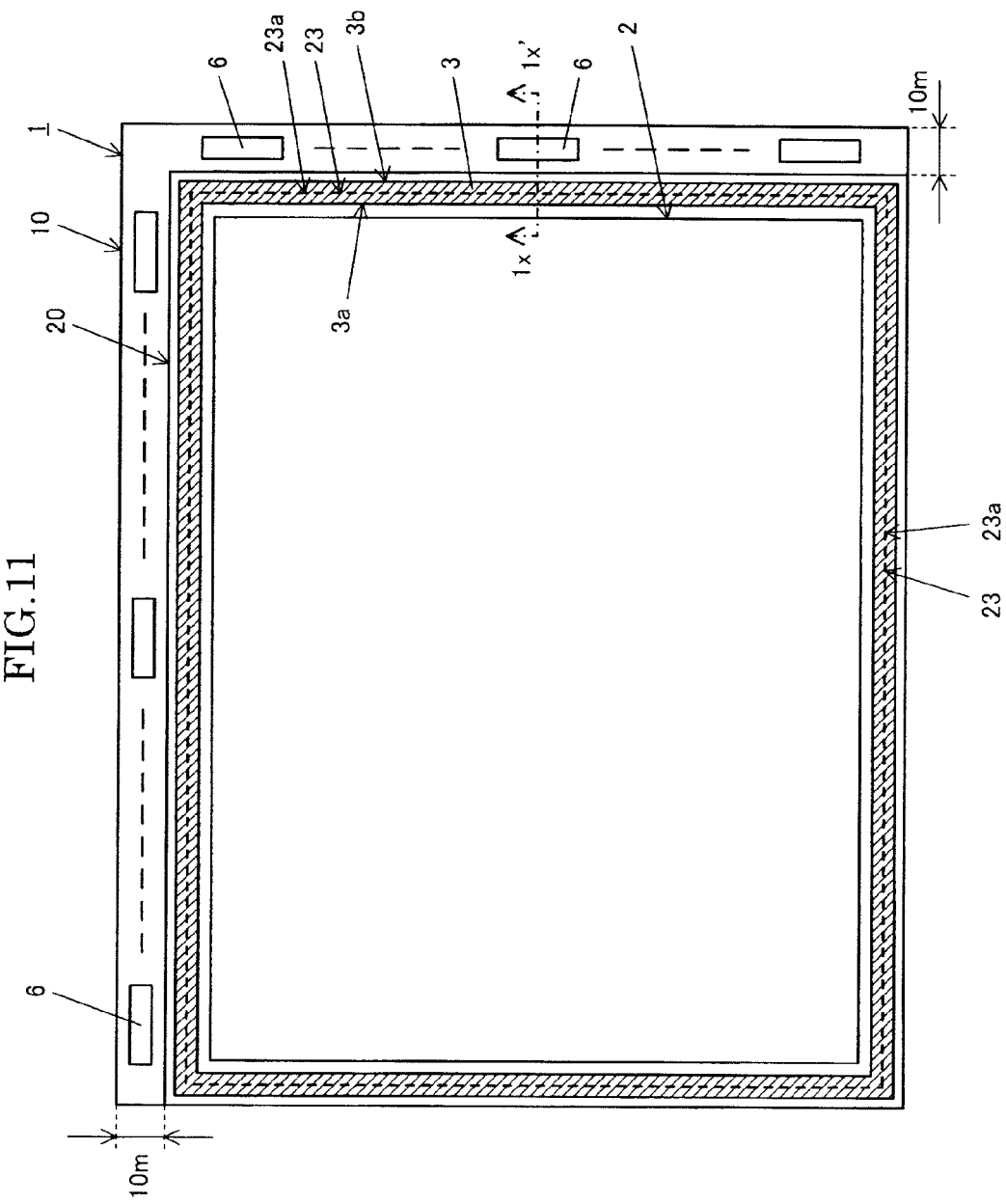
FIG. 11 is a plan diagram schematically showing the structure of the liquid crystal display device according to the second embodiment of the present invention.
Figure 12:
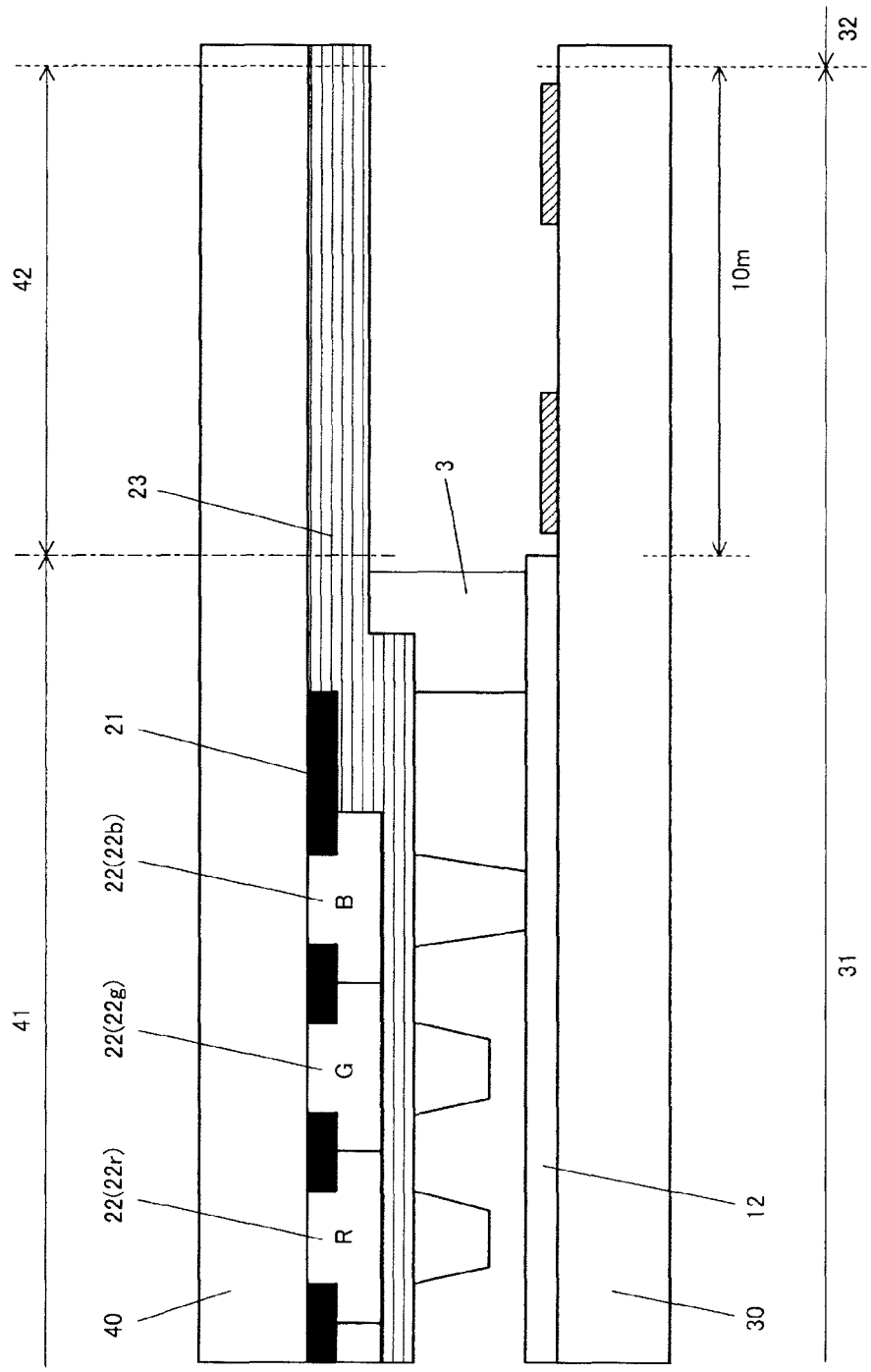
FIG. 12 is a cross sectional diagram showing the multi-TFT substrate and the multi-CF substrate pasted together during the manufacture of conventional liquid crystal display devices.

Here, FIG. 12 is a cross sectional diagram showing a multi-TFT substrate and a multi-CF substrate pasted together during the manufacture of a conventional liquid crystal display device. In the manufacture of a conventional liquid crystal display device, as shown in FIG. 11, the protective film 23 for the multi-CF substrate 40 is formed on the entire surface of the multi-CF substrate 40, that is to say, formed over the cell regions 41 and the separation regions 42, and therefore the protective film 23 is also cut when the multi-CF substrate 40 is divided by mechanically cutting through the separation regions 42 using a wheel. In addition, the separation regions 42 in the multi-CF substrate 40 overlap the non-overlapping region 10m in the cell regions 31 of the multi-TFT substrate 30 as viewed from the top. Therefore, shavings and pieces of the protective film 23 adhere to the non-overlapping region 10m in the TFT substrate 10 as foreign substances. That is to say, in the convention liquid crystal display devices, the probability of a foreign substance adhering to the non-overlapping region 10m of the TFT substrate 10 is high.

In contrast, in the present embodiment, the outer peripheral end 23a of the protective film 23 in the multi-CF substrate 40 (CF substrate 20) is located inside the outer periphery of the cell regions 41 (outer peripheral end of the CF substrate 20) and between the two sides (inner wall surface 3a, outer wall surface 3b) of the sealing material 3 opposite each other, and therefore the protective film 23 is not cut even when the multi-CF substrate 40 is divided by mechanically cutting through the separation regions 42 using a wheel, and thus there is no such problem that shavings or pieces of the protective film 23 adhere to the non-overlapping region 10m of the cell regions 31 (TFT substrate 10) in the multi-TFT substrate 30 as foreign substances. As a result, when a semiconductor chip 6 is mounted in the non-overlapping region 10m on the TFT substrate 10, the mounting of a semiconductor chip can be prevented from being defective due to a foreign substance adhering to the non-overlapping region 10m on the TFT substrate 10, and therefore the yield of manufacture of liquid crystal display devices can be increased.

In addition, in the present embodiment, different spacers in pillar form are formed, and at the same time the protective film 23 is selectively formed in the cell regions 41, and therefore the number of steps for manufacture can be reduced.

In addition, in the present embodiment, a sealing material 3 made of a thermosetting epoxy resin material, to which a material having light blocking properties, for example, a black pigment such as titanium black or carbon black, is added, is used as the sealing material 3, and therefore light can be prevented from leaking through the sealing material 3 and the display performance of the liquid crystal display device can be increased.

In addition, the outer peripheral end 23a of the protective film 23 is located mainly in the sealing material 3, except the opening 5 through which liquid crystal is injected, and therefore moisture can be prevented from entering inside from the outside through the interface between the outer peripheral end 23a of the protective film 23 and the sealing material 3 in the part located inside this sealing material 3, and thus the reliability of the liquid crystal display device can be increased.

[Second Embodiment]

FIG. 11 is a plan diagram schematically showing the structure of the liquid crystal display device according to the second embodiment of the present invention.

The liquid crystal display device according to the second embodiment basically has the same structure as that of the first embodiment, except the following.

In the first embodiment, as shown in FIG. 1, the opening 5 through which liquid crystal is injected is provided in a portion of the sealing material 3, while in the second embodiment, as shown in FIG. 11, no opening through which liquid crystal is injected is provided in the sealing material 3, and the sealing material 3 is formed continuously along the outer periphery of the CF substrate 20. The thus-formed liquid crystal display device in the second embodiment has the same effects as that in the first embodiment. In addition, the entirety of the outer peripheral end 23a of the protective film 23 is located inside the sealing material 3, and therefore moisture can further be prevented, as compared to the first embodiment, from entering the inside from the outside through the interface between the outer peripheral end 23a of the protective film 23 and the sealing material 3.

Though the invention by the present inventor is described above on the basis of the embodiments, the present invention is not limited to the above described embodiments and various modifications are, of course, possible as long as the scope of the invention is not deviated from.

What is claimed is:

1. A liquid crystal display device, comprising a liquid crystal display panel having:
   a first substrate;
   a second substrate;
   a sealing material provided between the first substrate and the second substrate so that the first substrate and the second substrate are pasted together; and
   a liquid crystal layer sealed in the region surrounded by the sealing material between the first substrate and the second substrate; wherein
   the second substrate has a color filter, a protective film for covering the color filter, and a light blocking film coated with the protective film on the surface of the second substrate on the liquid crystal layer side, an end of the protective film is located inside an end of the second substrate between a most inner wall surface and a most outer wall surface of the sealing material and closer to a periphery of the second substrate than a position of the light blocking film with respect to the periphery of the second substrate, the protective film is made of a protective material, and the end of the protective film is formed by removing a part of a protective material.

2. The liquid crystal display device according to claim 1, wherein the liquid crystal display panel has an opening through which liquid crystal is injected provided in a portion of the sealing material, and an end of the protective film is partially exposed from the sealing material through the opening through which liquid crystal is injected.

3. The liquid crystal display device according to claim 1, wherein the sealing material is continuously formed along the outer periphery of the second substrate.

4. The liquid crystal display device according to claim 1, wherein the first substrate has a non-overlapping region which does not overlap with the second substrate, and a semiconductor chip equipped with a drive circuit for driving and controlling the liquid crystal display panel is mounted in the non-overlapping region.

5. The liquid crystal display device according to claim 1, wherein the sealing material is made of a material having light blocking properties.

6. The liquid crystal display device according to claim 1, wherein the protective film is made of a photosensitive material and has a structure that has been patterned in accordance with a photolithographic technology.

7. The liquid crystal display device according to claim 1, wherein the liquid crystal display panel has spacers in pillar form between the first substrate and the second substrate, and the spacers in pillar form are formed integrally with the protective film through patterning of the protective film.

8. A manufacturing method of a display device comprising the steps of:

preparing a multi TFT substrate including a plurality of first cell regions arranged in matrix, each of the first cell regions having a pixel electrode and a thin film transistor;

preparing a multi color filter substrate including a plurality of second cell regions arranged in matrix, each of the second cell regions having a color filter and a light blocking film;

forming a protective material covering the color filter and the light blocking film of each of the second cell regions;

removing a part of the protective material so as to form an end of a protective film made of the protective material on each of the second cell regions;

pasting the multi TFT substrate and the multi color filter substrate to each other via at least one sealing material, the end of the protective film being located between a most inner wall surface and most outer wall surface of the at least one sealing material;

cutting the multi color filter substrate and the multi TFT substrate so as to form a plurality of LCD panels, each of the LCD panels including a first substrate having the first cell region, a second substrate having the second cell region, the protective film, the at least one sealing material, and a liquid crystal layer; and arranging an IC driver on the first substrate of the LCD panel;

wherein the at least one sealing material surrounds the liquid crystal layer;

wherein the pixel electrode, the thin film transistor, the liquid crystal layer, the protective film, the color filter and the light blocking film are arranged between the first substrate and the second substrate;

wherein the end of the protective film is located closer to a periphery of the second substrate than a position of the light blocking film with respect to the periphery of the second substrate, and wherein the end of the protective film is located inside an end of the second substrate.

9. The manufacturing method of the display device according to claim 8, wherein the LCD panel has an opening provided in a portion of the at least one sealing material through which liquid crystal of the liquid crystal layer is injected, and wherein the end of the protective film is partially exposed from the at least one sealing material through the opening through which liquid crystal is injected.

10. The manufacturing method of the display device according to claim 8, wherein the at least one sealing material is continuously formed along an outer periphery of the second substrate.

11. The manufacturing method of the display device according to claim 8, wherein the first substrate has a non-overlapping region which does not overlap with the second substrate, and wherein the IC driver for driving and controlling the LCD panel is mounted in the non-overlapping region by the step of arranging the IC driver.

12. The manufacturing method of the display device according to claim 8, wherein the at least one sealing material is made of a material having light blocking properties.

13. The manufacturing method of the display device according to claim 8, wherein the protective film is made of a photosensitive material and has a structure that has been patterned in accordance with a photolithographic technology.

14. The manufacturing method of the display device according to claim 8, wherein the LCD panel has spacers in pillar form between the first substrate and the second substrate, and wherein the spacers in pillar form are formed integrally with the protective film through patterning of the protective film.

15. The manufacturing method of the display device according to claim 8, wherein a plurality of sealing materials are provided.

* * * * *